(12) United States Patent
Dawson

(10) Patent No.: US 11,349,155 B2
(45) Date of Patent: May 31, 2022

(54) ELECTROLYTE ELEMENT AND A CELL INCORPORATING THE ELECTROLYTE ELEMENT

(71) Applicant: Lina Energy Ltd., Landcaster (GB)

(72) Inventor: Richard Dawson, Lancaster (GB)

(73) Assignee: Lina Energy Ltd.

( * ) Notice: Subject to any disclaimer, the term of this patent is extended or adjusted under 35 U.S.C. 154(b) by 72 days.

(21) Appl. No.: 16/755,094

(22) PCT Filed: Oct. 12, 2018

(86) PCT No.: PCT/GB2018/052943
§ 371 (c)(1),
(2) Date: Apr. 9, 2020

(87) PCT Pub. No.: WO2019/073260
PCT Pub. Date: Apr. 18, 2019

(65) Prior Publication Data
US 2020/0243916 A1    Jul. 30, 2020

(30) Foreign Application Priority Data
Oct. 13, 2017    (GB) ..................... 1716779

(51) Int. Cl.
*H01M 10/39* (2006.01)
*H01M 10/615* (2014.01)
(Continued)

(52) U.S. Cl.
CPC ......... *H01M 10/399* (2013.01); *H01M 4/582* (2013.01); *H01M 10/0422* (2013.01);
(Continued)

(58) Field of Classification Search
CPC ............. H01M 10/399; H01M 10/613; H01M 10/0422; H01M 10/049; H01M 10/615;
(Continued)

(56) References Cited

U.S. PATENT DOCUMENTS

| 4,003,753 A | 1/1977 | Hall |
| 2010/0239893 A1* | 9/2010 | Gordon ................. H01M 4/136 |
| | | 429/50 |

(Continued)

FOREIGN PATENT DOCUMENTS

| WO | 2015037990 | 3/2015 |
| WO | 2016168727 | 10/2016 |

OTHER PUBLICATIONS

International Search Report and Written Opinion for International Application No. PCT/GB2018/052943 dated Oct. 12, 2018.

*Primary Examiner* — Maria Laios
*Assistant Examiner* — Bartholomew A Hornsby
(74) *Attorney, Agent, or Firm* — Tumey L.L.P.

(57) ABSTRACT

An electrolyte element (10) comprises a perforated sheet (11) of non-reactive metal such as an aluminium-bearing ferritic steel, and a non-permeable ceramic layer (16*b*) of sodium-ion-conducting ceramic bonded to one face of the perforated sheet (11) by a porous ceramic sub-layer (16*a*). The perforated sheet (11) may be of thickness in the range 50 μm up to 500 μm, and the thickness of the non-permeable ceramic layer (16*b*) may be no more than 50 μm, for example 20 μm or 10 μm. Thus the electrolyte properties are provided by the non-permeable thin layer (16*b*) of ceramic, while mechanical strength is provided by the perforated sheet (11). The electrolyte element (10) may be used in a rechargeable molten sodium-metal halide cell, in particular a sodium/nickel chloride cell (20). It makes cells with increased power density possible.

18 Claims, 2 Drawing Sheets

(51) Int. Cl.
*H01M 4/58* (2010.01)
*H01M 10/04* (2006.01)
*H01M 10/0562* (2010.01)

(52) U.S. Cl.
CPC ..... *H01M 10/0562* (2013.01); *H01M 10/615* (2015.04); *H01M 2300/0074* (2013.01)

(58) Field of Classification Search
CPC .. H01M 10/657; H01M 4/0476; H01M 4/664; H01M 4/76; H01M 4/762; H01M 2300/0074; H01M 10/38; H01M 10/3927; H01M 10/58
See application file for complete search history.

(56) References Cited

U.S. PATENT DOCUMENTS

| | | | |
|---|---|---|---|
| 2011/0210954 A1* | 9/2011 | Murphy | H01M 10/425 345/211 |
| 2013/0084485 A1 | 4/2013 | Vallance | |
| 2016/0233542 A1* | 8/2016 | Jongerden | H01M 50/449 |
| 2016/0308253 A1* | 10/2016 | Robins | H01M 4/381 |

* cited by examiner

ELECTROLYTE ELEMENT AND A CELL INCORPORATING THE ELECTROLYTE ELEMENT

The present invention relates to an electrolyte element, to a way of making the electrolyte element, and to a cell that incorporates the electrolyte element. It also relates to a battery formed of such cells.

The invention is pertinent for example to a molten sodium-metal halide rechargeable battery, such as the sodium/nickel chloride cell which may be referred to as a ZEBRA cell (see for example J. L. Sudworth, "The Sodium/Nickel Chloride (ZEBRA) Battery (*J. Power Sources* 100 (2001) 149-163). A sodium/nickel chloride cell incorporates a liquid sodium negative electrode separated from a positive electrode by a solid electrolyte which conducts sodium ions. The solid electrolyte may for example consist of beta alumina. The positive electrode includes nickel, nickel chloride and sodium chloroaluminate which is liquid during use and acts as a secondary electrolyte to allow transport of sodium ions from the nickel chloride to the solid electrolyte. The positive electrode also incorporates aluminium powder. The cell operates at a temperature which is typically below 350° C., but must be above the melting point of the sodium chloroaluminate, which is 157° C., and the operating temperature is typically between 270° and 300° C. During discharge the normal reactions are as follows:

Cathode (positive electrode): 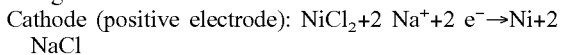
NaCl

Anode (negative electrode): 

the overall result being that anhydrous nickel chloride (in the cathode) reacts with metallic sodium (in the anode) to produce sodium chloride and nickel metal; and the cell voltage is 2.58 V at 300° C. The cell is typically assembled in its completely discharged state, i.e. using nickel powder mixed with sodium chloride for the cathode, and generating the sodium metal and nickel chloride by charging the cell. The cathode composition may also incorporate iron sulphide, which provides sulphur which inhibits changes in the particle size of the nickel during repeated charge and discharge cycles, and the iron enhances cell performance particularly towards the end of cell discharge, and during current pulses. Such cells typically utilise a ceramic tube of beta alumina as the electrolyte, which may be a cylindrical tube, or may be a tube with a convoluted surface.

This type of cell has major theoretical advantages over other battery technologies, in particular there are no competing side reactions, so there can be 100% charge efficiency; there is no self-discharge; the cell can be self-regulating in the charging regime, preventing over-charge failures; if a cell in a series-connected battery were to fail, the failed cell will have a resistance comparable to that of an intact cell, so the series can continue to operate; and the materials of which the cell is made are inexpensive. However, ZEBRA cells have hitherto used a tube of sodium-ion-conducting ceramic with a wall thickness of at least 1 mm as the electrolyte, and consequently the cell must operate at above about 270° C. to ensure that the electrolyte has sufficient sodium ion conductivity. The thickness of the electrolyte also means that typical start-up times from ambient are measured in hours to ensure the electrolyte does not crack. The high operating temperature and slow start-up time have limited this type of battery to certain niche applications. However, unsupported thinner electrolyte layers would be insufficiently strong to withstand the stresses during manufacture, assembly and operation.

The present invention accordingly provides an electrolyte element comprising a perforated sheet of non-reactive metal, and a non-permeable layer of sodium-ion-conducting ceramic bonded to one face of the perforated sheet.

In this electrolyte element the strength can therefore be provided by the metal sheet, and this enables the electrolyte thickness to be significantly reduced as compared to that required in a conventional ZEBRA cell. This results in a cell or a battery that can perform adequately at significantly lower temperatures, for example less than 200° C. Furthermore a significantly thinner layer of ceramic also significantly reduces stresses induced by heating from ambient, so start-up times from ambient can be just a few minutes. These are both commercially advantageous benefits.

In a second aspect the present invention provides a method of making an electrolyte element comprising forming a perforated sheet of non-reactive metal, and forming a non-permeable layer of sodium-ion-conducting ceramic bonded to one face of the perforated sheet by sintering a precursor for the ceramic at a temperature above 650° C. and usually above 700° C.

The non-permeable layer of ceramic may be made by a sintering process at elevated temperature, typically above 650° C., and which may be above 700° C. for example 800° C., 900° C. or 950° C., but typically less than 1150° C. The non-permeable layer of ceramic is non-porous, or may have closed, non-connecting pores. It is preferably of less than 5% porosity and so more than 95% dense. The non-permeable layer of ceramic may be bonded directly to the face of the perforated sheet, or it may be bonded indirectly to the face of the perforated sheet by being bonded to a porous ceramic sub-layer that is bonded to the face of the perforated sheet. The porous ceramic sub-layer should be permeable, and may have a porosity between 15% and 50% (and so be between 50% and 85% dense); and may be made from a composition that contains pore formers, and larger particles than those used to make the non-permeable ceramic layer. The ceramic layer may for example be made by a process that involves sintering the porous ceramic sub-layer, and then forming a densified top layer made with particles that are smaller than those used to form the porous ceramic sub-layer, so as to form the non-permeable ceramic layer. The non-permeable ceramic layer may for example comprise beta alumina, but in addition it may contain a material that forms a glass during the sintering process. Thus although it is referred to as a ceramic layer, the term "ceramic" in this context includes combinations of ceramic and glass, as long as the layer is conductive to sodium ions during operation. The non-permeable ceramic layer must not be permeable, that is to say it would be impermeable to gases, and consequently impermeable to liquids during operation.

Where there is a porous and permeable ceramic sub-layer between the non-permeable layer of sodium-Ion-conducting ceramic and the face of the perforated sheet, the porous ceramic sub-layer may be of a material that is also a sodium ion conductor. This would have the benefit of providing a larger surface area of sodium-ion-conducting material. Alternatively the porous ceramic sub-layer may be of a material that does not conduct sodium ions.

For use in a sodium/nickel chloride cell the non-reactive metal in the perforated sheet may be nickel, or a corrosion-resistant alloy such as an aluminium-bearing ferritic steel, in particular of the type known as Fecralloy (trade mark) which is iron with up to 20% chromium, 0.5-12% aluminium, and 0.1-3% yttrium. For example it might comprise iron with 15% chromium, 4% aluminium, and 0.3% yttrium. When this metal is heated in air it forms an adherent oxide coating of alumina which protects the alloy against further oxidation; this oxide layer also protects the alloy against corrosion during sintering of the ceramic. Where this metal is used as a substrate, and is coated with a ceramic layer, the alumina oxide layer on the metal is believed to bind with the ceramic coating, so ensuring the ceramic material adheres to the metal substrate. Another potential corrosion-resistant steel alloy would be one that forms a chromia or CrMn spinel surface oxide layer on heating; this surface oxide layer is electronically conductive. The provision of the porous ceramic sub-layer provides benefits both during manufacture of the electrolyte element, and during use of a cell that incorporates the electrolyte element.

It will be appreciated that metals such as nickel and steel have a higher thermal expansivity than ceramic materials. The ceramic material forms a solid sintered structure during sintering at an elevated temperature which is well above the operating temperature of the cell in which the electrolyte is to be used. Hence during operation of the cell the metal substrate holds the ceramic material under compression because the operating temperature of the cell (say 250° or 300° C.) is significantly less than the temperature during sintering. The sheet of metal provides strength, while the non-permeable layer of ceramic provides the electrical insulation and sodium-ion-conducting properties required of the electrolyte.

The perforated sheet may for example be of thickness in the range 50 µm up to 500 µm, more preferably between 80 µm and 250 µm. It may for example be a metal foil with perforations, for example holes of diameter between 20 µm and 60 µm for example 30 µm, the holes being provided at a spacing of between 100 µm and 200 µm, for example 150 µm, or larger holes of diameter between 60 µm and 100 µm for example 70 µm at a spacing between 150 µm and 300 µm for example 200 µm, on a square array or a hexagonal array. The centre-to-centre separation between holes in the array may be between two and ten times the diameter of the holes. Such perforations may be made by a laser, or by chemical etching. Alternatively the perforated sheet may be an expanded metal sheet, that is to say a sheet that has been provided with multiple slits and has then been stretched length-wise and width-wise so the slits open out into apertures. In this case the metal sheet would preferably be pressed or calendered so it is flat, before formation of the ceramic layer. It may also be possible to use a woven metal mesh as the perforated sheet, if it has been calendered so that it is flat. The thickness of the ceramic layer may be less than that of the perforated sheet, as long as it is sufficiently thick that it does not have through-pores, and so is non-permeable. For example it may be of thickness no more than 50 µm, for example 20 µm or 10 µm.

The invention will now be further and more particularly described, by way of example only, and with reference to the accompanying drawings, in which.

Figure 1:
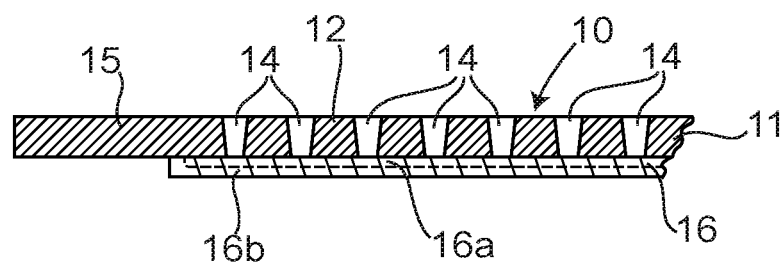
FIG. 1 shows a sectional view of an electrolyte of the invention.

Referring to FIG. 1, an electrolyte element 10 comprises a sheet 11 of a metal such as nickel, or aluminium-bearing ferritic steel, such as the type known as Fecralloy (trade mark), or a steel that forms a CrMn oxide scale when heated in air. The sheet 11 is of thickness 0.2 mm. Most of the sheet—the central region 12—is perforated for example by laser drilling to produce a very large number of through holes 14, the holes each being of mean diameter 30 µm and being separated by between 150 µm and 200 µm for example in a hexagonal array; as a result of the laser drilling process, each hole 14 is in practice slightly tapered along its length, for example from 35 µm at the top surface (as shown), on which the laser is incident, to 25 µm at the opposite surface. A margin 15 around the periphery of the sheet 11, of width 5 mm, is not perforated. The hole dimensions and separations are given here by way of example; as an alternative the holes 14 might be of mean diameter for example between 50 µm and 100 µm and separated by between 200 µm and 800 µm. It will also be appreciated that the holes 14 may be made by a different technique, such as chemical etching, and that consequently their cross-sectional profile may differ from that shown.

Where the sheet 11 is of an aluminium-bearing ferritic steel, it may then be heated at an elevated temperature in air so that it forms an adherent alumina layer on all the surfaces. After forming the through holes 14, and if appropriate forming the alumina layer by oxidation, one surface of the perforated central region 12 is then covered in an impermeable coating layer 16 of a sodium-ion-conducting ceramic. A number of different ceramics are suitable for forming this layer 16. For example materials such as β"-alumina, or $Na_{1+x}Zr_2Si_xP_{3-x}O_{12}$, or combinations such as $Na_3PO_4$—$Na_2SO_4$, or glass ceramics such as $Na_3PS_4$ would be suitable for this purpose. The layer 16 is preferably of thickness less than 100 µm, more preferably less than 30 µm, for example 20 µm or 10 µm (and is shown with an exaggerated thickness in the figure, for clarity). The layer 16 is deposited by depositing the material in powdered form, for example combined with a liquid such as water or an organic alcohol to form a slurry; dried; and then sintered. The deposition may use a technique such as screen printing. The sintering requires an elevated temperature that depends on the composition of the ceramic material, but is typically above 700° C., for example 800° C. or 900° C. Some materials may require an even higher sintering temperature.

Figure 2:
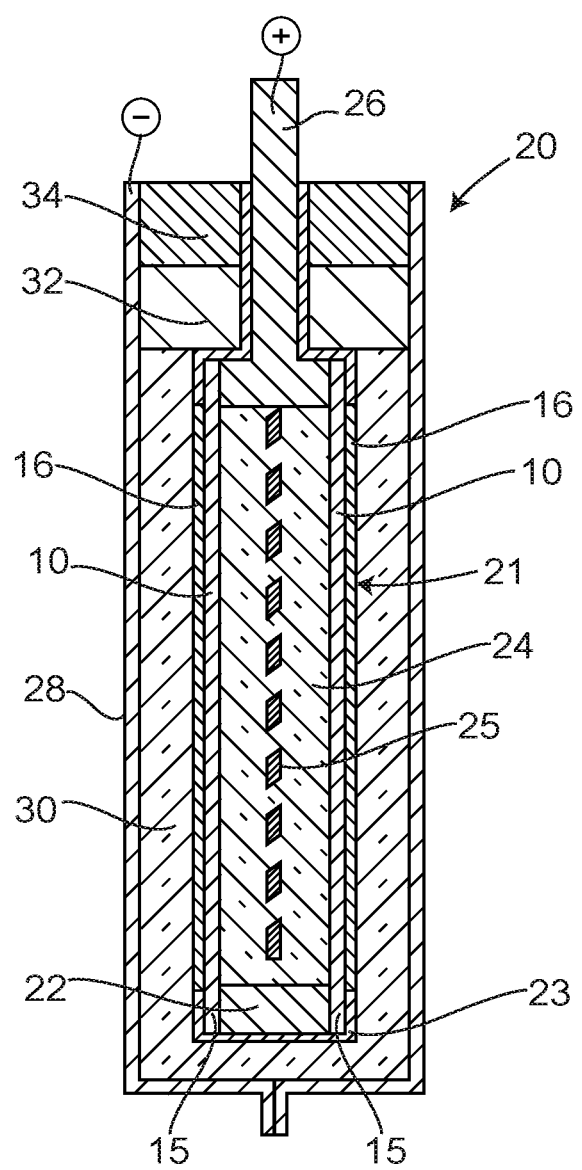
FIG. 2 shows a sectional view of a sodium/nickel chloride cell of the invention, incorporating the electrolyte of FIG. 1.

Referring now to FIG. 2, there is shown a sectional view through a rechargeable molten sodium/nickel chloride electrical cell 20, shown in its initial, uncharged state; the view is not to scale. The cell 20 comprises a pouch 21 formed of two electrolyte elements 10 with the ceramic coating layers 16 facing outwards, and whose non-perforated peripheral margins 15 are welded to a metal frame 22, typically of nickel (the perforation holes 14 are not shown in FIG. 2). This welding process may use laser welding. The margins 15 and the outer edges of the metal frame 22 are then coated with an electrically insulating coating 23 of a polymer such as PTFE which can withstand the operating temperature of the cell 20. A powder mixture 24 fills the pouch 21 between the electrolyte elements 10; and there is also an expanded mesh nickel sheet 25 between the electrolyte elements 10 and embedded within the powder mixture 24 to ensure good electrical contact. The powder mixture 24 includes nickel powder, sodium chloride, and sodium chloroaluminate ($NaAlCl_4$) and preferably also small proportions of iron sulphide and iron chloride, and aluminium powder. The powder mixture 24 may be mixed and then granulated before being introduced into the pouch 21, to inhibit segregation of the component materials. The metal frame 22 includes a projecting tab 26 to act as an external electrode contact. The electrically insulating coating 23 covers all the exposed portions of the metal frame 22, and covers most of the tab 26, leaving an end portion uncoated to enable electrical contact to be made.

The pouch 21 is located centrally within a stainless steel can 28, and carbon felt 30 fills the space between the electrolyte elements 10 and the stainless steel can 28; the outer surfaces of the pouch 21 and the inner surface of the stainless steel can 28 are sprayed with carbon black. The projecting tab 26 is then sealed to the adjacent portions of the stainless steel can 28 using a high-temperature thermoplastic polymer such as polyvinylidene fluoride (PVdF), so there is a seal 32. Before sealing in this manner, the stainless steel can 28 is evacuated, to remove air. There may then be a further external seal 34 of a high-temperature-resistant room temperature vulcanising silicone.

This description is of the cell 20 in a discharged state, which is the form in which it may be manufactured. For the cell to operate, it must be heated to a temperature above 157° C., such as 200° C., at which the sodium aluminium chloride is molten; and at such a temperature the ceramic layer 16 will conduct sodium ions sufficiently. The molten sodium chloroaluminate enables sodium ions to diffuse within the pouch 21 between sodium chloride and the ceramic layer 16 of the electrolyte elements 10. The cell 20 can be charged by applying a voltage from an external power supply, between the stainless steel can 28 (which is connected to the negative electrode of the external power supply) and the projecting tab 26 (connected to the positive electrode). This consequently attracts sodium ions through the ceramic layers 16 of the electrolyte elements 10 into contact with the carbon felt 30, where sodium metal is formed; at the same time within the pouch 21 the remaining chloride ions react with the nickel to form nickel chloride. These are the reverse of the reactions that take place during discharge. So when the cell 20 is fully charged, a substantial part of the nickel powder has been converted to nickel chloride within the pouch 21, and there is sodium metal occupying much of the space within the stainless steel can 28, which is molten because of the elevated temperature.

It will be appreciated that the electrolyte thickness within the cell 20 is the thickness of the ceramic layer 16, which as described above may be only 10 μm or 20 μm thick. This means that the electrolyte provides very little electrical resistance if the cell is operated at above 270° C., as is required in conventional ZEBRA cells; and also means that excellent cell performance can be achieved at significantly lower operating temperatures, or with ceramic materials with somewhat lower sodium ion conductivities than beta-alumina. Furthermore the total energy available per unit volume of a cell of the invention is about 0.43 kWh/L, which is considerably greater than is achievable with ZEBRA cells (0.13 kWh/L), while the power available per unit volume is about 1.9 kW/L, which is approximately twice that available from a modern rechargeable lithium ion battery, and many times greater than that available from a ZEBRA cell (0.04 kW/L).

Referring again to FIG. 1, in a preferred modification, the non-permeable ceramic coating layer 16 is replaced by a porous and permeable sub-layer 16a covered by a non-permeable ceramic layer 16b, as indicated by a broken line in FIG. 1; as shown by the broken line, the non-permeable layer 16b also encapsulates the edges of the permeable sub-layer 16a. The porous and permeable sub-layer 16a may be of the same sodium-ion-conducting ceramic as the non-permeable ceramic layer 16b, but would typically be formed from a slurry containing somewhat larger particles. The porous sub-layer 16a may be deposited, dried and sintered first, and then the non-permeable ceramic layer 16b deposited, dried and sintered on top, or alternatively the sub-layer 16a may be deposited and dried, and then the slurry to form the non-permeable ceramic layer 16b deposited on top, and dried, and then the combined layer 16 subjected to a single sintering step.

The porous and permeable ceramic sub-layer 16a may be of thickness between 10 μm and 100 μm, and the non-permeable layer 16b may be of a thickness in the range 5 μm to 50 μm, for example 20 μm, 30 μm or 40 μm.

The provision of the porous and permeable sub-layer 16a makes it possible to use a thinner non-permeable ceramic layer 16b without risking the existence of through-pores, particularly across the holes 14. The deposition of the non-permeable ceramic layer 16b uses fine particles in a slurry that contains minimal plasticisers, so that when the deposit is dried it may have a high green density. Without the porous sub-layer 16a there would be a lack of mechanical support to the dried ceramic material across the holes 14, which would tend to result in local stress concentrations that would initiate cracks during sintering or operation. In contrast, the porous ceramic sub-layer 16a may be deposited from a formulation that has coarser particles and additives such as plasticisers, and when the deposit is dried the additives tend to hold it together so the green precursor has a higher green strength but may have a lower green density, so this formulation has sufficient green strength to be self-supporting over the holes 14 during fabrication. Furthermore, the relatively small dimensional changes that occur during sintering of the porous sub-layer 16a result in minimal stress concentrations, and so no cracking. Although the ceramic sub-layer 16a is porous, the pore size is much smaller and the pores are more uniformly distributed than the holes 14 through the metal sheet 11, so the ceramic sub-layer 16a provides a suitable support for the non-permeable layer 16b. Furthermore the provision of the porous sub-layer 16a reduces the effect of the mismatch in thermal expansion between the metal sheet 11 and the non-permeable layer 16b.

Additionally, the porous ceramic sub-layer 16a may be deposited in such a way as to create a textured surface which subsequently promotes adhesion of the non-permeable ceramic layer 16b.

If, as described above, the non-permeable ceramic layer 16 is replaced by the porous ceramic sub-layer 16a covered by the non-permeable ceramic layer 16b, the porous and permeable ceramic sub-layer 16a enables the reacting species to diffuse laterally, to or from the holes 14, ensuring the ionic reactions can take place more uniformly over the outer surface of the ceramic layer 16, and so achieving maximum electrode efficiency at the electrolyte/electrode interface.

The cell 20 as described above provides a voltage during discharge of about 2.58 V. If a larger voltage is required, or if more current is required than is available from a single cell 20, multiple cells 20 may be combined to form a battery, either in series or in parallel or with parallel connection of series of cells. The cells 20 provide the benefits available from a ZEBRA cell, but as mentioned above provide significant additional benefits. As with a ZEBRA battery the cell 20 involves no side reactions and so provides 100% coulombic efficiency; there are no organic electrolytes, so avoiding fire hazard; it is tolerant to high ambient temperatures, and enables easy heat rejection; it is safe if punctured and self-extinguishing in a fire; over-discharge and under-discharge do not cause problems as there are safe and reversible alternative reactions which occur under these conditions; there is no self-discharge, and so a long shelf-life in the charged state; and no hazardous chemicals are required during assembly. In the form of a battery pack with cells in series, individual cell failure does not have a significant detrimental effect, as a failed cell (in which the electrolyte has broken) will fail as a short circuit.

As compared to a ZEBRA cell, the cell 20 is considerably more robust because the strength of the electrolyte element 10 is provided by the metal sheet 11; the cell 20 can experience higher heating rates and larger thermal gradients, and provides better thermal coupling for heat transfer, because the cell 20 and the electrolyte element 10 is much thinner; the diffusion paths are shorter so higher power cells can be provided.

If a cell 20 is to be used on its own, it must be provided with an external source of heat in order to heat it to the operating temperature, and with thermal insulation to minimise heat loss to the environment. Where a number of cells 20 are combined into a battery, each cell 20 is self-contained, so there is no sharing of electrolyte between adjacent cells, so combining cells 20 merely necessitates placing cells 20 adjacent to each other, but electrically insulated from each other, and connecting the electrical terminals (the can 28 and the tab 26 respectively) in a desired fashion. As with the single cell 20, the battery requires an external source of heat, and external thermal insulation.

Figure 3:
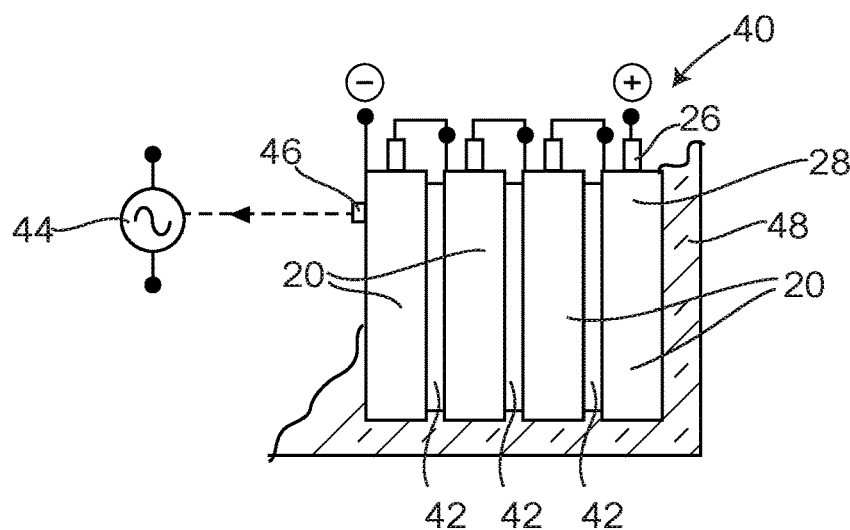
FIG. 3 shows a schematic side view of a battery incorporating cells as shown in FIG. 2.

Referring now to FIG. 3 there is shown a schematic side view, partly in section, of part of a battery 40. The battery 40 consists of multiple cells 20 connected electrically in series, the projecting tab 26 of one cell being connected electrically to the can 28 of the adjacent cell; only four cells 20 are shown. Between successive cells 20 are electrical heaters 42, each consisting of a heater element encapsulated within or between layers of electrical insulator. The electrical heaters 42 may be connected to an external electricity supply 44 (the individual connections are not shown), the electricity supply 44 being controlled in response to signals from at least one temperature sensor 46 arranged to monitor the temperature of at least one of the cells 20. All the cells 20 are enclosed within a layer 48 of electrical and thermal insulation. The electrical heaters 42 are arranged to heat the cells 20 to the required operating temperature. By way of example the electrical heaters may be of the type that comprises a printed heater element.

In other contexts it may be appropriate to use alternative heating methods. For example if a battery consisting of multiple cells 20 is used in combination with an internal combustion engine, for example in a motor vehicle, heat from the exhaust gases may be transferred to the cells 20 using a heat exchanger. Similarly if such a battery is used in conjunction with a combined heat and power unit, the heat source may be used to heat the cells 20 to the required operating temperature.

It will be appreciated that the electrolyte element 10, the cell 20, and the battery 40 are described by way of example only, and that they may be modified in a number of ways. For example as mentioned above the electrolyte element 10 may include a ceramic layer 16 in which a ceramic sub-layer 16a adjacent to the metal sheet 11 is porous, while a ceramic sub-layer 16b further from the metal sheet 11 is non-porous; and may be deposited by traditional wet thick film techniques such as screen printing, or by deposition processes that use a higher solvent-to-solid ratio such as spray deposition. As previously mentioned the perforation holes 14 may have a different size to that described above; and the thickness of the metal sheet 11 and of the ceramic layer 16 may differ from that described above.

As regards the cell 20, the electrical insulation 23 around the perimeter of the pouch 21 may be of a different material to that mentioned above, and may be of a different thickness to that of the ceramic layer 16. The expanded mesh nickel sheet 25 within the pouch 21 may be replaced by a perforated metal sheet, or a woven metal mesh; and in every case it may be fixed to or integral with the frame 22. Alternatively, the expanded mesh nickel sheet 25 may be omitted, if there is sufficient electrical conductivity through the powder mixture 24. As regards the space between the electrolyte elements 10 and the stainless steel can 28, this may enclose one or more metal foil elements in addition to or instead of the carbon felt 30, to provide electrical contact and wicking for molten sodium.

It will also be appreciated that as regards the cell 20 it is also feasible to arrange the cathode compartment to surround the anode compartment rather than vice versa.

Figure 4:
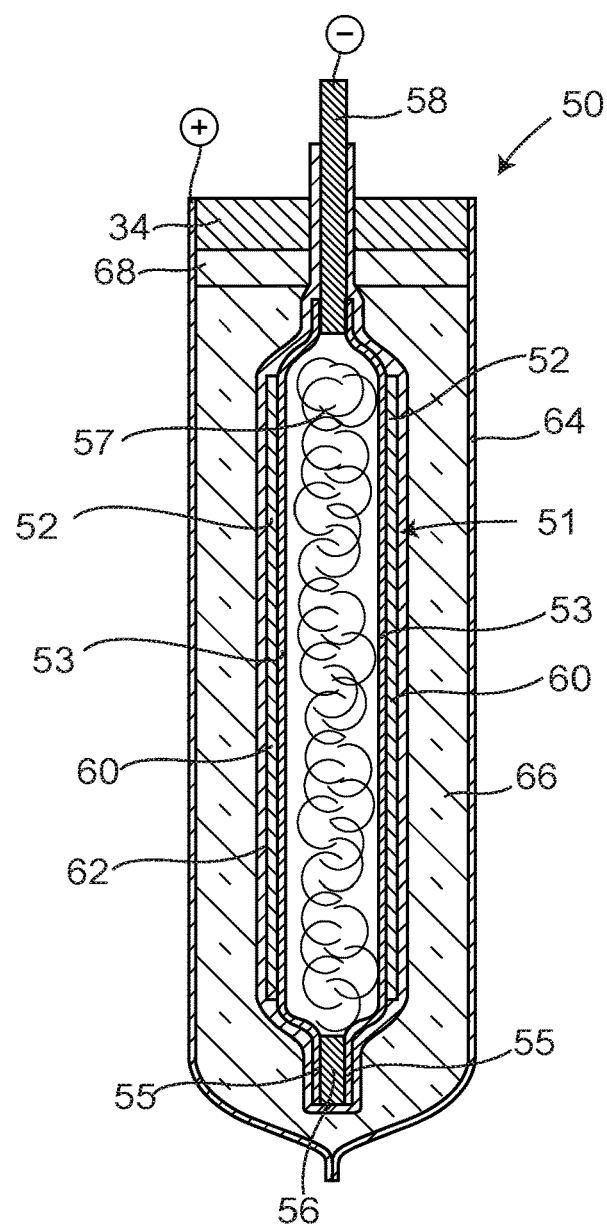
FIG. 4 shows a sectional view of an alternative sodium/nickel chloride cell of the invention that incorporates the electrolyte of FIG. 1.

Referring now to FIG. 4, there is shown a sectional view through an alternative rechargeable molten sodium/nickel chloride electrical cell 50, shown in its initial, uncharged state; the view is not to scale. The cell 50 comprises a pouch 51 formed of two electrolyte elements 52 each of which consists of a dish-shaped metal sheet 53 with perforation holes 14 as described in FIG. 1 (not shown in FIG. 4), and with a non-perforated flat peripheral rim 55. The metal sheet 53 is of a steel alloy that forms a CrMn spinel oxide layer when heated in air. The rims 55 are welded to a metal frame 56, for example by laser welding, after inserting steel wool 57 into the space within the pouch 51. The metal frame 56 defines a projecting tab 58.

The assembled pouch 51 is then heated in air to a sufficiently high temperature to form a CrMn spinel oxide over the entire surface. The CrMn spinel oxide acts as a barrier to ion diffusion. The portions of the metal sheets 53 that have the perforation holes 14 are then coated on the outside with a sub-layer 60 of porous ceramic by covering those portions with a slurry containing particles of a precursor for the ceramic material, drying and sintering. Then the entire pouch 51, including the frame 56 and all except the tip of the tab 58, is then dipped in a suitable slurry, withdrawn, dried and sintered so that it is coated with a non-porous sodium ion conducting ceramic layer 62. This non-porous ceramic layer 62 may for example be of thickness 10 µm, and it is non-permeable, corresponding to the non-permeable ceramic layer 16b described above.

The pouch 51 is located centrally within a can 64 which may be of nickel, or a steel that forms a CrMn spinel oxide layer. A powder mixture 66 fills the can 64 around the pouch 51. As with the powder mixture 24 described above, the powder mixture 66 includes nickel powder, sodium chloride, and sodium chloroaluminate ($NaAlCl_4$) and preferably also small proportions of iron sulphide and iron chloride, and aluminium powder. The powder mixture 66 may be mixed and then granulated before being introduced into the can 64, to inhibit segregation of the component materials. The projecting tab 58 is then sealed to the adjacent portions of the can 64 using a high-temperature thermoplastic polymer such as polyvinylidene fluoride (PVdF), so there is a seal 68. There may then be a further external seal 34 of a high-temperature-resistant room temperature vulcanising silicone as described above.

The cell 50 would then be heated to the required operating temperature, and then charged in substantially the same way as with the cell 20, so that molten sodium metal is formed within the pouch 51, and nickel chloride is formed in the can 64 surrounding the pouch 51. During the first charging step, any oxygen with the pouch 51 reacts with the sodium metal, so that thereafter there is no oxygen present. Subsequent discharging and recharging take place in the same way as with the cell 20 described earlier.

The molten sodium formed during charging within the porous ceramic sub-layer 60 wicks through the porous ceramic sub-layer 60 to emerge through the perforation holes 14. It has been found that the presence of the CrMn spinel oxide scale on the surfaces of the metal sheets 53 of the pouch 51 gives a good interface with the molten sodium, helping to wick molten sodium into the pouch 51 during charging. This may therefore avoid the need for the provision of carbon black. Furthermore the electrical conductivity of CrMn scale on the surfaces of the metal sheets 53 is sufficient to provide electrical conductivity between the molten sodium and the metal sheets 53 and consequently to the frame 56 and so the tab 58. Consequently the cell 50 does not require provision of an expanded mesh nickel sheet 25, as provided in the cell 20.

The cell 50 operates in substantially the same way as the cell 20, differing only in the polarity of the terminals, and multiple cells 50 can be assembled into a battery equivalent to the battery 40.

Where an electrolyte element, such as the electrolyte elements 52, includes a porous ceramic sub-layer 60, this may be made of the same ceramic material is used to form the non-porous sodium-ion-conducting ceramic layer 62. Typically the slurry used to produce the porous sub-layer 60 would contain larger particles than that used to produce the non-porous ceramic layer 62. In addition the slurry used to produce the non-porous ceramic layer 62 may also contain particles of a glass-forming material. Alternatively the porous ceramic sub-layer 60 may be of a different ceramic material to that of the non-porous sodium-ion-conducting ceramic layer 62; and indeed the porous ceramic sub-layer 60 may be of a ceramic material that is not a sodium ion conductor. The non-porous ceramic layer 62 must be non-permeable, so it may have no pores, or may have closed, non-connecting pores, so it is preferably of less than 5% porosity and so more than 95% dense.

In a further alternative the metal sheets 11 used in the electrolyte elements 10 of FIGS. 1 and 2 may be of a different metal to that described in relation to FIG. 1, and in particular may be of a steel that forms a CrMn spinel oxide. As another alternative the metal sheets 11 may be dished like the metal sheets 53, so as to increase the space within the pouch 21 without requiring such a wide frame 22.

It will also be appreciated that as regards the cell 50 it is also feasible to arrange the cathode compartment within the anode compartment rather than vice versa.

What is claimed:

1. An electrolyte element for a molten sodium/metal chloride electric cell, the electrolyte element comprising an electrolyte layer of sodium-ion-conducting ceramic which is non-permeable to gases and liquids, a porous ceramic sub-layer that is permeable to gases and liquids, and a perforated sheet of metal, non-reactive in such a cell, to support the non-permeable electrolyte layer, wherein the porous ceramic sub-layer has one face bonded to the non-permeable electrolyte layer of sodium-ion-conducting ceramic and an opposite face bonded to the perforated sheet of metal, so that the non-permeable electrolyte layer of sodium-ion-conducting ceramic is bonded indirectly to one face of the perforated sheet by being bonded to the porous ceramic sub-layer that is bonded to the face of the perforated sheet, both the electrolyte layer and the porous sub-layer being sintered.

2. The electrolyte element as claimed in claim 1 wherein the non-permeable ceramic layer is non-porous.

3. The electrolyte element as claimed in claim 1 wherein the porous ceramic sub-layer is of a material that is also a sodium ion conductor.

4. The electrolyte element as claimed in claim 1 wherein the non-reactive metal of the perforated sheet is nickel, or is an aluminium-bearing ferritic steel, or a steel that forms a surface coating of chromia or CrMn spinel oxide.

5. The electrolyte element as claimed in claim 4 wherein the non-reactive metal is an aluminium-bearing ferritic steel which has been heated in air to form an adherent oxide coating of alumina before being coated with the ceramic layer.

6. The electrolyte element as claimed in claim 1 wherein the perforated sheet is of thickness in the range 50 µm up to 500 µm, more preferably between 80 µm and 250 µm.

7. The electrolyte element as claimed in claim 1 wherein the perforated sheet is a metal foil with perforations which are holes of width between 20 µm and 60 µm, at a spacing of between 100 µm and 200 µm, on a square array or a hexagonal array.

8. The electrolyte element as claimed in claim 1 wherein the perforated sheet is an expanded metal sheet, and preferably has been pressed or calendered so it is flat before formation of the ceramic layer.

9. The electrolyte element as claimed in claim 1 wherein the thickness of the non-permeable ceramic layer is no more than 100 µm, for example 50 µm, 20 µm or 10 µm.

10. A rechargeable molten sodium-metal halide cell incorporating the electrolyte element as claimed in claim 1.

11. A The rechargeable cell as claimed in claim 10 which is a sodium/nickel chloride cell.

12. The rechargeable cell as claimed in claim 11 comprising a pouch defined by two electrolyte elements, wherein edges of the two electrolyte elements being bonded to a metal frame, and the pouch being mounted within a container, wherein the pouch contains metal chloride and sodium chloroaluminate during operation and the container contains an inert electrical conductor and sodium during operation, or vice versa.

13. The rechargeable cell as claimed in claim 12 wherein each perforated metal sheet has a peripheral margin which is not perforated, wherein the peripheral margins of the sheets are welded to the metal frame, and wherein the outer surfaces of the pouch defined by the peripheral margins and by the metal frame are coated with a non-permeable polymeric electrical insulator.

14. The rechargeable cell as claimed in claim 12 wherein each perforated metal sheet has a peripheral margin which is not perforated, wherein the perforated portions of the metal sheets are coated with a porous ceramic sublayer, the peripheral margins of the sheets are welded to the metal frame, and wherein the non-permeable layer of sodium-ion-conducting ceramic covers the outer surfaces of the pouch including both the metal sheets and also the metal frame.

15. A battery comprising multiple rechargeable cells as claimed in claim 10, the battery also comprising electrical heaters between adjacent cells.

16. A battery comprising multiple rechargeable cells as claimed in claim 12, the battery also comprising electrical heaters between adjacent cells.

17. A battery comprising multiple rechargeable cells as claimed in claim 13, the battery also comprising electrical heaters between adjacent cells.

18. A battery comprising multiple rechargeable cells as claimed in claim 14, the battery also comprising electrical heaters between adjacent cells.

* * * * *